May 22, 1962   L. J. BISHOP   3,035,683
POWERED ROLL CONVEYOR STRUCTURE
Filed Sept. 17, 1959   3 Sheets-Sheet 1
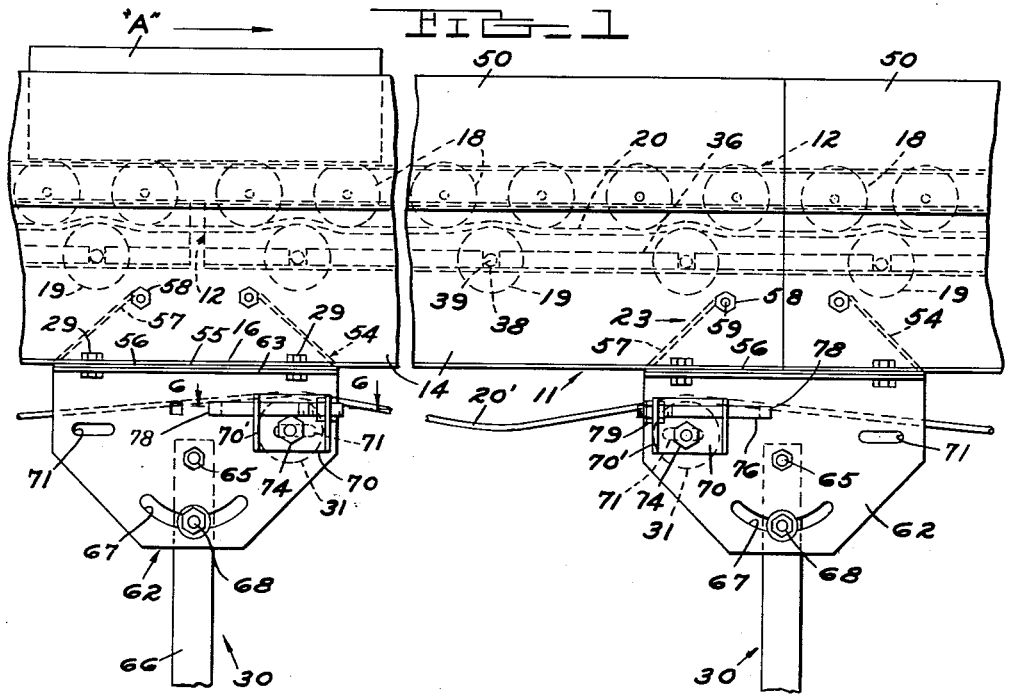
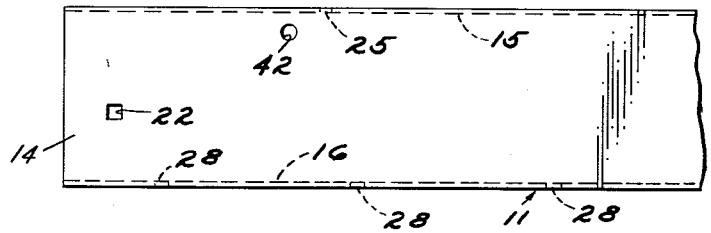
INVENTOR.
LEONARD J. BISHOP
BY
ATTORNEYS

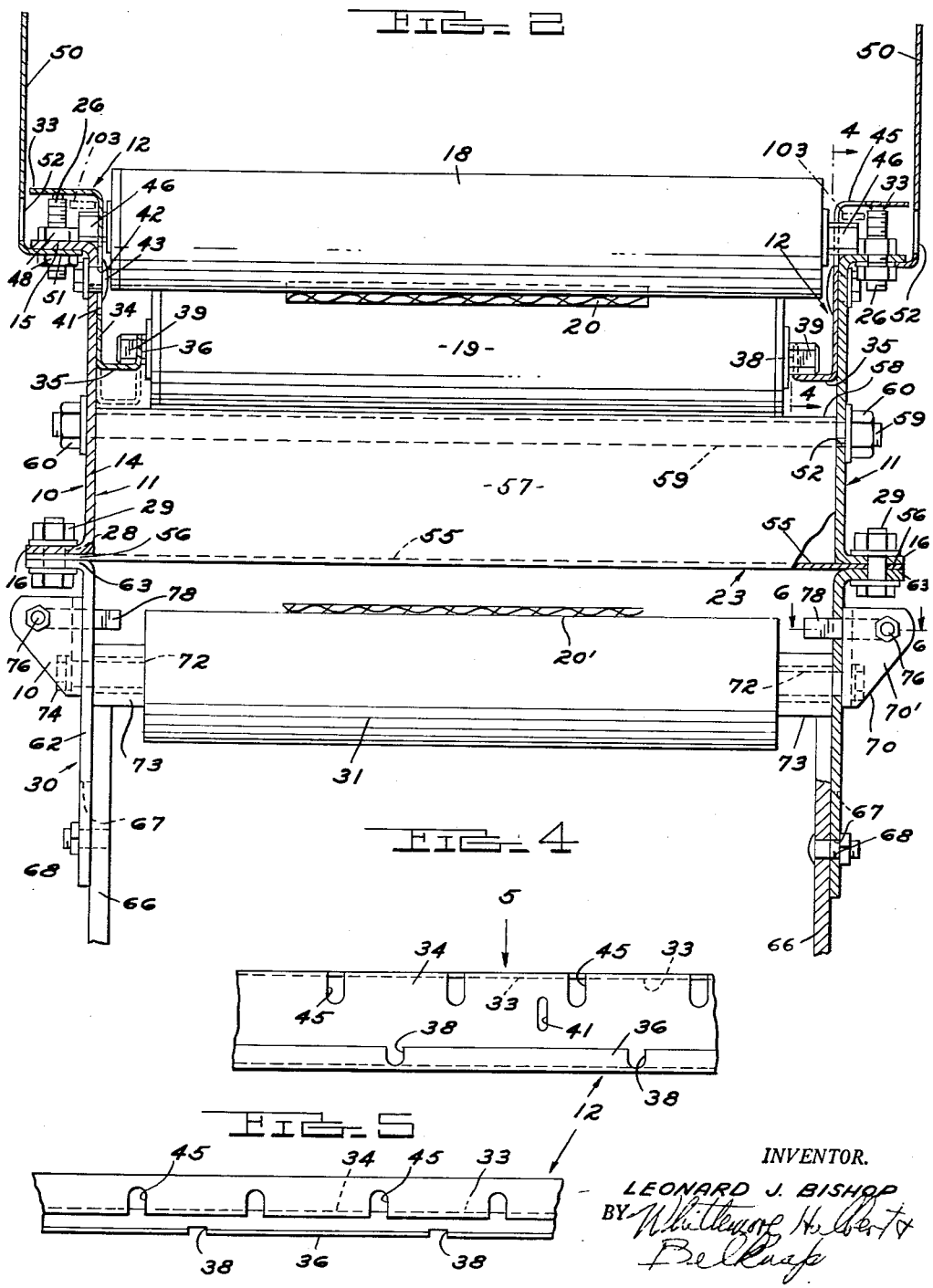

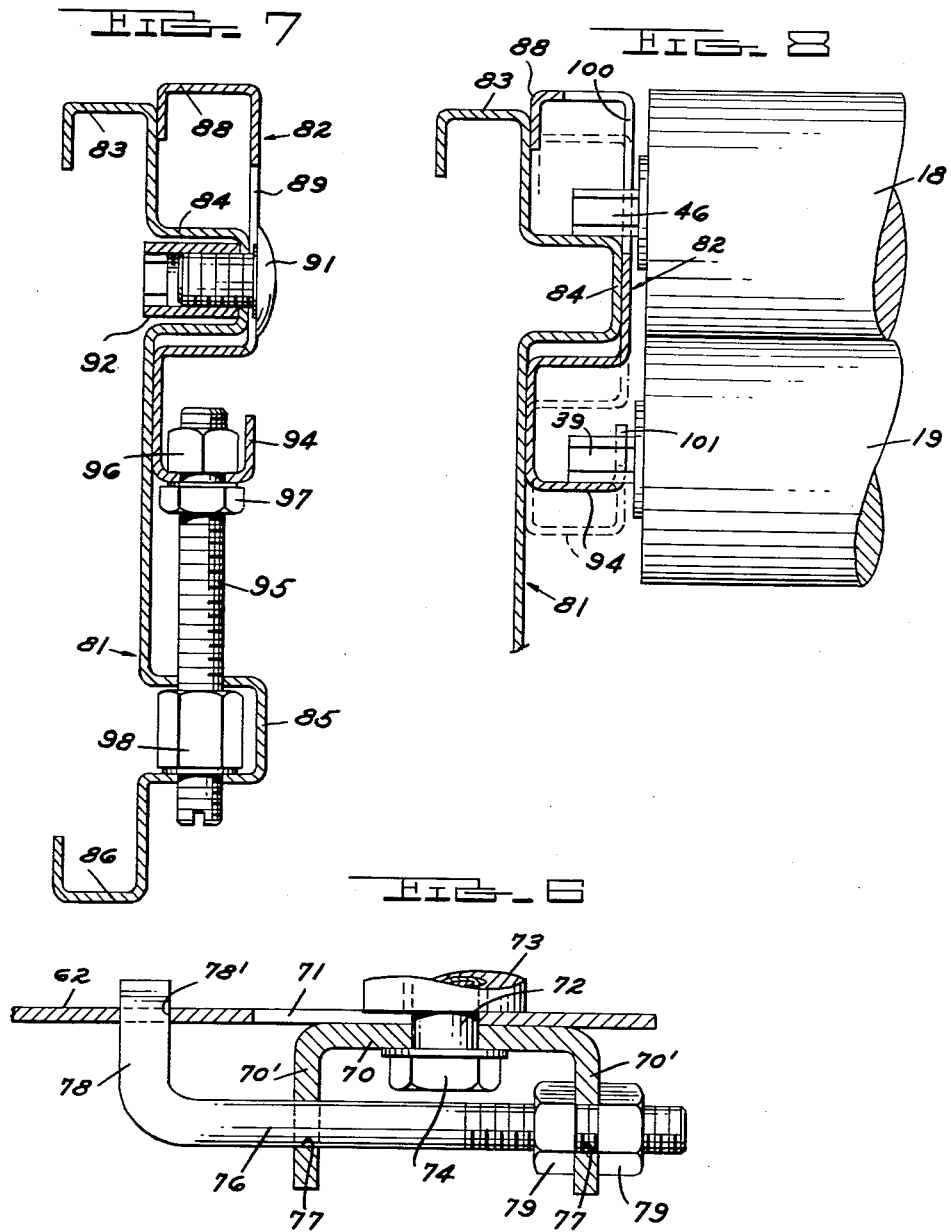

United States Patent Office 3,035,683
Patented May 22, 1962

3,035,683
POWERED ROLL CONVEYOR STRUCTURE
Leonard J. Bishop, Birmingham, Mich., assignor to Mechanical Handling Systems, Inc., Detroit, Mich., a corporation of Michigan
Filed Sept. 17, 1959, Ser. No. 840,637
17 Claims. (Cl. 198—127)

The present invention relates to an improved conveyor structure of the powered roll or so-called live roll type, characterized by a longitudinal series of elongated cylindrical rolls or rollers, upon which articles are conveyed in the longitudinal direction, under the drive of the rollers by an endless power belt traveling therebeneath, and itself sustained by a series of pressure rollers. Conveyors of this description are having increasingly wide use in installations in which great masses of bulk articles must be conveyed along a main feed line, or along auxiliary or branch feed lines operating at an angle to the main line, as in the handling in a postoffice of parcels of widely varying size, in warehouse installations, and the like.

It is an object of the invention to provide improved powered roller conveyor structure of this type which is very inexpensively fabricated of simple roll-formed parts or stampings, yet which, as assembled by resort to the improved provisions to be described, provides a conveyor unit of great rigidity, sturdiness and strength.

Another object is to provide a conveyor structure incorporating a series of carrier rollers arranged with their axes parallel to one another and in desired longitudinal spacing transversely of the axes, a further series of pressure rollers, an endless driven belt threaded between the rollers of the respective series and suitably driven for constant speed longitudinal travel, and a framework of novel construction mounting these rollers, belt and driving means therefor, in an improved fashion.

More specifically, it is an object to provide conveyor structure of this sort, in which neither the carrier rollers nor the pressure rollers project outwardly of the outermost confines of the framework, so that excessive aperturing or stamping of the latter tending to weaken it is unnecessary.

It is a further object of the invention to provide a conveyor having an improved framework supporting rollers and a roller driving or powered belt in an improved manner, such that the rollers may be readily removed for inspection or replacement without in any degree altering the parts of the framework, or by requiring the roller shafts to be pulled endwise from the framework.

Still another object is to provide structure of this sort, in which the framework is fabricated of individual, inner and outer longitudinally extending frame members or side rails, each provided with provisions for mounting the shafts of the rollers in an improved manner enabling the removal of the latter in the way described above.

Yet another object is to provide powered roller conveyor structure, in which the adjustment of rollers, as to elevation or spacing, may be conveniently accomplished from the exterior of the framework, with a maximum of ease and in a minimum time.

A further object is to provide conveyor structure of this type, in which the power belt is sustained on a lower horizontal return reach by further idler rollers having means to mount the same in an improved fashion.

Another and more specific object is to provide a conveyor structure including a framework constituted by individual inner and outer frame member or side rails of improved design. Thus, the inner rails or side pieces carry provisions for receiving the ends of the respective carrier and pressure roller shafts in a way enabling the rollers to be simply lifted out of apertures in the inner rail receiving those shafts. The outer rail or side pieces in turn sustain the inner rails in an improved, rugged manner, the outer rails being rigidly braced in parallel relation to one another, both intermediate their respective ends and at joints at which successive rail components are united end to end, by improved sheet metal bracing and tie rod provisions.

In further specific accordance with the invention, the tying and bracing structure is such that the successive endwise rail parts are locked, both horizontally by elongated tie-rods extending through the outer frame rails or side pieces and vertically by bolts or studs which secure outwardly directed flanges on these members to tongue extensions of the sheet metal tying and bracing unit.

Other objects will become apparent as the following description proceeds especially when taken in conjunction with the accompanying drawings wherein:

FIG. 1 is a fragmentary view in side elevation, partially broken away, illustrating a portion of the improved powered roller conveyor of the invention;

FIG. 2 is a fragmentary view, in enlarged scale, in transverse vertical section through the structure of FIG. 1;

FIG. 3 is a fragmentary side elevational view of one of the outer frame rails or side pieces of the structure, as seen from its inner side;

FIG. 4 is a view in inner side elevation, as from the line 4—4 of FIG. 2, showing a portion of an inner frame rail or side member of the structure;

FIG. 5 is a plan view of this member, as from the direction of the arrow 5 in FIG. 4;

FIG. 6 is a fragmentary view in enlarged scale and in section on a line corresponding to line 6—6 of FIGS. 1 and 2; and FIGS. 7 and 8 are views in transverse vertical section of an alternative type of side rail or frame structure contemplated by the invention, these views being taken in different, longitudinally spaced planes through the same equipment.

In the preferred embodiment of the invention illustrated in FIGS. 1 through 6 of the drawings, a frame structure is generally designated by the reference numeral 10. This structure comprises, on each of the opposite parallel, longitudinally extending sides of the apparatus, an outer upright rail 11 and an associated inner rail or frame side piece 12. These members are preferably roll formed in lengths of, say, ten feet. The outer rails 11 are of suitable gage or thickness to afford adequate rigidity and supporting strength, and are preferably of channel-like outline, characterized by an upright web 14 of substantial height and correspondingly outwardly facing flanges 15, 16, respectively. The inner frame rail or side member 12 may be of lesser thickness, since it does not support the upper load supporting rollers 18, but merely provides means for locating them longitudinally and laterally. It further provides means for locating the supporting pressure rollers 19, which carry the upper run or reach of belt 20 and urge it upwardly into driving engagement with rollers 18.

As illustrated in FIGS. 2 and 2 of the drawings, considered in conjunction with FIG. 1, each of the outer rails or side members 11 is provided, adjacent each of its opposite ends, with an appropriate aperture 22 in its upright web 14, the function of which is to assist in the splicing of successive rails 11, and the lateral bracing of the same in parallel relation to one another, as through the agency of a special tying and bracing unit, generally designated 23 and to be hereinafter described. It is also desirable that a corresponding bracing unit be employed at the midpoints of the respective paralleled pairs of outer side rails or members 11.

The upper flange 15 of each rail member 11 is punched at 25 for the reception of an adjusting screw 26 (FIG. 2) which screws 26 are thus received in a longitudinally spaced series along the respective top flanges 15, and serve as supports for the respective inner side members or rails 12 of the framework of the equipment. The bottom flanges 16 are also punched at 28 to receive upright locking screws 29 (FIG. 2) by which the outer rails 11 are locked to an appropriate type of standard, generally designated 30 and hereinafter described in detail, by which the series of return belt rollers 31 are sustained, thus to sustain the bottom reach 20' of the power belt 20.

Corresponding structural details of the inner side rails or reaches 12 are illustrated in FIGS. 4 and 5, also to be considered in conjunction with FIG. 2 of the drawings. Thus each of the members 12 is formed to provide an upper, outwardly extending flange 33 at a right angle to its upright web 34. The lower edge of the rail 12 is formed to extend inwardly at a right angle at an inturned flange element 35, which is then bent vertically upwardly at 36.

As best illustrated in FIG. 2 of the drawings, the upturned or upbent extension 36 is formed at intervals corresponding to the intended longitudinal spacing of the pressure rolls 19 with upwardly opening recesses or seats 38 (FIG. 5); and the end trunnion members 39 of the rollers 19 are received in these seats, preferably having flattened parallel sides engaging adjacent side surfaces of the seats 38 to restrain the roller trunnions 39 from rotation relative to the inner frame rails 34.

Intermediate the height of its upright web 34, each of the rails 12 is provided with vertically elongated slots 41, each adapted to be laterally registered with a circular aperture 42 (FIG. 3) in the adjacent web 14 of an outer rail 11, this slot and aperture receiving a bolt or stud 43, as shown in FIG. 2. Thus, by loosening and taking up the series of bolts or studs 43 it is possible to adjust vertically the relative position of the inner rails or side members 12 in relation to the adjacent outer rails or members 11.

Along the zone of junction of the upper flange 33 of rail 12 with its upright web 34, this flange and web are provided with a series of notches or recesses 45 opening into the respective horizontal and vertical surfaces of both thereof. The longitudinal spacing of the respective recesses 45 relative to one another corresponds with the desired longitudinal spacing of the upper article conveying or carrier rollers 18; and these rollers have end trunnions 46 received in the respective seats. As in the case of the pressure rolls 19, the trunnions 46 of the carrier rollers have flattened sides engageable with the adjacent side edges of the recesses 45, thus to restrain the trunnions from rotation relative to the respective inner rails 12.

As applied to the upper flanges 15 of the outer rails 11, the adjustable supporting screws 26 are provided with releasable lock nuts 48 above and below the flange, enabling the support for the rails 12 to be rigidly secured, once it is in adjusted position. Recesses 45 of the inner rails 12 extend downwardly sufficiently that the trunnions 46 of rollers 18 will never rest on the bottom of these recesses, for if they did, any further upward adjustment of the inner rails would raise both sets of rollers 18, 19 and make it impossible to increase the upward pressure on belt 20. It is also to be seen that none of the end trunnions 39 of rollers 19 extend through or outwardly beyond either rail; while the trunnions 46 of the rollers 18 do not reach to the outer edge of the top flange 33 of rail 12. Thus snagging projections are avoided, and undue weakening of the rail structure by punching the same at the rails 11 is unnecessary.

If desired, upright side restraining plates 50 may be provided along either or both of the parallel sides of the conveyor structure, these members having inturned bottom flanges 51 which may be clamped between the rail flange 15 and the lower lock nut 48. Further, the restraining plates or members 50 may be provided with access openings adjacent these nuts for the external application of a wrench to the uppermost thereof, such openings being designated 52 in FIG. 2.

Referring to FIG. 2, the range of vertical adjustment of the inner rails on the outer rails is indicated in solid and dotted lines, and it may be seen that any or all of the respective carrier rollers 18 and pressure rollers 19 may be easily and quickly removed for inspection or replacement by simply lifting the trunnions 46 of the former out of the upper seats or recesses 45 in the inner rails 12, and/or by correspondingly lifting the trunnions 39 of the pressure rollers 19 out of the recesses 38. Upon being thus lifted slightly to clear the recesses 38, the rollers 19 may be canted horizontally so as to enable them to be lifted upwardly and clear of the power belt 20.

The framework as thus constituted is rigidly spliced together at the end joints of its component outer rails or side members 11 by the splicing and bracing units 23, and it is further rigidly braced intermediate the lengths of the rails by similar bracing units 23. To this end, each unit 23 comprises a length of sheet metal whose width, between the webs 14 of the rails 11, equals the lateral spacing of the latter, i.e., in the direction of the axes of the rollers 18, 19. This sheet metal member, designated 54, is horizontal and flat at its central bottom portion 55, where it is provided on each of its sides with a tongue extension 56 (FIG. 2) which projects outwardly beneath the adjacent bottom flange 16 of an outer rail or side member 11, for a purpose to be described.

At either end of the center portion 55, the member 54 has its ends 57 bent upwardly and longitudinally toward one another, as shown in FIG. 1; and the termini of these angularly convergent end portions 57 are rolled to provide transversely elongated sleeve or eye formations 58 in which elongated tie rods or bolts 59 are received. The opposite ends of the respective tie rods 59 extend through the rectangular apertures 22 in the webs 14 of rails 11, and nuts 60 are threaded on the rod ends and taken up to lock the splicing and bracing unit 23 rigidly between the rails 11. The locking action of the tie rods and unit 23 is augmented by further locking provisions, to be described; and unit 23 squares frame 10 accurately.

Reference has been made to the provision of appropriate upright base or standard means 30 for supporting the structure 10 of the invention. As illustrated in FIGS. 1 and 2, this may comprise a series of special brackets in the form of stamped sheet metal plates 62 of appropriate rigidity, which are arranged in transversely opposed pairs at suitable spacing along the length of the apparatus. Thus, in a typical installation incorporating outer side rails 11 of, say, ten feet in length, there will be a pair of the bracket plates 62 at each end joint of the rails and one intermediate the ten foot length. Each of the plates 62 is of a roughly truncated and inverted triangular section, featuring a flat, 90° outturned top flange 63 extending longitudinally thereof. As best shown in FIG. 2, the opposed, laterally projecting tongue extensions 56 at the longitudinal center of each of the splicing and bracing units 23 are sandwiched between an outturned flange 16 of a side rail 11 and the adjacent outturned flange 63 of a bracket or plate 62. The bolts 29 lock the three parts together along this zone; so that it is seen that, in addition to the end-bracing effect of the angularly bent sheet metal member 55 of the unit 23, as locked by the tie rods 59, the structure is additionally braced and rigidified by the vertical bolts 29, resulting in a very rugged character, indeed.

The opposed plates or brackets 62 of each pair provide a top pivot at 65 for an upright standard or leg 66 of suitable rigidity, which legs may be appropriately braced relative to one another at their respective bottoms, as by means such as will suggest itself to those skilled in the art. An upwardly arcuate slot 67 is formed in each of the plates 62, in vertically spaced relation beneath its pivot at 65, the respective legs 66 having bolts or studs 68 received in the slots 67. This permits a tilting of the brackets 62, as well as the frame structure supported thereby, relative to the legs 66 if it is desired that the structure be employed to transport articles (such as the article A of FIG. 1) at an inclination to the horizontal.

Each of the brackets 62 of an opposed pair are provided, on the outer side surface thereof, with a secondary bracket or clip 70 of channel-shaped cross section, as best shown in FIG. 6 of the drawings. In order to mount these clips with their parallel flanges 70' upright, the plate 62 has horizontal elongated slots 71 in horizontally aligned relation to one another, one on either side of its vertical center line. Only one of the clips 70 need be applied to the bracket 62 to serve as a mount for one end of the shaft or trunnion 72 of one of the lowermost, belt-return rollers 31 (FIG. 2), the clip being registered with one or the other of the slots 71 in accordance with the longitudinal position of the roller 31 which is desired. The trunnion extends through a suitable spacer 73 between the roller end and the adjacent inner surface of the bracket or plate 62, and through the slot 71 and an aperture in clip or bracket 70, where it receives a suitable acorn or like nut 74 to lock the roller 31 at a desired horizontal angle of adjustment, as permitted by the horizontally elongated slot 71. Thus any or all of the lower rollers may have its axis angled or canted slightly if desired, thereby insuring that the belt reach 20' will track properly in the longitudinal direction, and thus to correspondingly control the accurate longitudinal travel of the belt 20 as a whole.

In order to actuate the bracket 70 for this adjustment, an elongated hooked stud 76 is provided to extend through aligned apertures 77 in the outurned flanges of the secondary clip 70. The stud 76 has a 90° inturned end or toe 78 receivable in a squared aperture in the clip or bracket 62, and lock nuts 79 are applied to the threaded end of the stud 76, for coaction with a flange of the secondary bracket interlocking the latter in the desired horizontal position of adjustment.

It is seen from the foregoing that the invention affords a powered roller structure, in which aperturing of the frame rail members is maintained at an absolute minimum, and in which these rail members are readily roll formed in an inexpensive manner. The carrier and pressure rollers 18, 19, respectively, are readily accessible from the top and outside of the structure, and may be readily and quickly lifted out of the frame and replaced as readily and quickly. A wide range of adjustment of the respective rollers relative to one another is possible, and accurate tracking of the power belt 20 can be maintained by a simple adjustment at the mounting brackets 62, which also enable the inclination of the respective series of rollers to be adjusted as desired relative to the horizontal. As indicated above, it is only necessary that one of the belt-return rollers 31 be mounted by each of the opposing pairs of brackets 62, thus rendering the structure less expensive, while still adequately guiding the power belt in its return reach.

FIGS. 7 and 8 of the drawings ilustrate an alternative embodiment of the invention, in which the outer longitudinal side rails are of a channeled or beaded cross section for greater strength and load capacity, and the inner side rails are also of a modified cross section so that they fit together with the modified outer side rails and retain the novel features of the arrangement shown in FIGS. 1 through 5. Here, the reference numeral 81 generally designates an outer longitudinal side rail whose function corresponds to that of the outer rail 11 of the first embodiment, and the reference numeral 82 correspondingly designates an inner rail corresponding in function to the inner rail 12. These rails are, of course, arranged in opposed parallel relation on opposite sides of the longitudinal center line of the respective carrier and pressure rollers, 18, 19.

The outer rails 81 are formed to provide, at the top thereof, an outwardly and downwardly flanged lip 83 and, in downwardly spaced relation thereto, an inwardly extending, reentrant formation 84. A similar, inwardly extending reentrant formation 85 is provided adjacent the bottom of the rail member 81, which in this zone terminates in an outwardly and upwardly flanged lip portion 86.

The inner rail 82 has an outwardly and downwardly flanged top portion 88 which abuts outwardly against the lip portion 83 of rail 81. The rail or side member 82 is also formed beneath the upper lip 88 to provide a vertically elongated slot 89, which slot 89 receives a bolt 91 extending through an aperture in the reentrant formation 84 and threadedly taking into a nut 92 applied in this zone.

The lowermost portion of the inner rail 82 is formed to provide an inwardly and upwardly flanged formation 94, in a vertical aperture of which a screw rod 95 is received on an upright axis, with restraining nuts 96, 97 threadedly applied to the rod 95 within and beneath the formation 94, respectively. Rod 95 similarly extends through apertures in the reentrant portion 85, within which it has threadedly applied thereto an adjusting nut 98; and it is thus seen that upon rotative adjustment of adjusting nut 98, as from the exterior of the outer rail or side member 81, an adjustment of the vertical position of inner rail 82 relative to the latter is made possible. In zones spaced longitudinally from the adjusting zone described above, the inner rail is provided, at the junction of horizontal and vertical surfaces thereof, with the vertically elongated recesses or seats 100 (FIG. 8) in which the flattened trunnions 46 of the carrier rollers 18 are received and held against relative rotation. Similarly, the corresponding trunnions 39 of the pressure rollers 19 are non-rotatively received in recesses or seats 101 formed in the upturned flange portion of the bottom formation 94 of inner rail 82. Relatively adjusted vertical positions of the latter are illustrated in solid and dotted line in FIG. 8; and it is seen that the embodiment of FIGS. 7 and 8 possesses the same advantages in regard to ready removability and replacement of the rollers 18 and 19 as are possessed by the rollers of the first described embodiment.

While structural details of the various rollers 18, 19 and 31 do not constitute a part of the invention, they are preferably journalled for rotation on the respective fixed trunnions 46, 39 and 72 by means of internal bearings, in a known manner.

In the event the conveyor structure, as described in either of the embodiments thereof, is driven by a so-called ripple belt, having projecting cleats thereon and employed for the accumulation of articles at a given point, the invention contemplates the use of elongated hold-down strips 103, as illustrated in dot-dash line in FIG. 2 of the drawings, these strips extending longitudinally beneath the outturned flanges 33 of the inner rail member 12 and resting upon the trunnion 46 of the carrier rollers 18, thus restraining the latter from excessive upward movement in their seats 45. The ends of the strips 103 are hooked downwardly to restrain the same from longitudinal motion relative to the series of rollers 18.

What I claim as my invention is:

1. A powered roller conveyor comprising a series of carrier rollers having parallel, longitudinally spaced axes, an endless power member having one surface engaged by said rollers to drive said rollers, a series of pressure rollers engaging the opposite surface of said power member to maintain the latter in driving engagement with said carrier rollers, and a frame structure supporting said rollers and power member, comprising pairs of inner and outer, parallel upright rails on opposite lateral sides of said power members, the inner rail being provided with integral lower and upper portions elongated in the direction of the length thereof and flanged in the direction transverse of said length, said portions each having a longitudinally spaced series of recesses opening upwardly therethrough, said respective series of carriers and pressure rollers having their ends received in said recesses for vertical placement therein and removal therefrom, the outer rail being disposed in parallel, laterally adjacent relation to the exterior of said inner rail, outwardly of the shaft ends of said pressure rollers, and being provided with adjustable means engaging said inner rail to support the latter.

2. A powered roller conveyor comprising a series of carrier rollers having parallel, longitudinally spaced axes, an endless power member having one surface engaged by said rollers to drive said rollers, a series of pressure rollers engaging the opposite surface of said power member to maintain the latter in driving engagement with said carrier rollers, and a frame structure supporting said rollers and power member, comprising pairs of inner and outer, parallel upright rails on opposite lateral sides of said power member, the inner rail being provided with integral lower and upper portions elongated in the direction of the length thereof and flanged in the direction transverse of said length, said portions each having a longitudinally spaced series of recesses opening upwardly therethrough, the recesses of the respective series alternating in the longitudinal sense, said respective series of carrier and pressure rollers having their ends received in said recesses for vertical placement therein and removal therefrom, the outer rail being disposed in parallel, laterally adjacent relation to the exterior of said inner rail, outwardly of the shaft ends of said pressure rollers, and being provided with adjustable means engaging said inner rail to support the latter.

3. A powered roller conveyor comprising a series of carrier rollers having parallel, longitudinally spaced axes, an endless power member having one surface engaged by said rollers to drive said rollers, a series of pressure rollers engaging the opposite surface of said power member to maintain the latter in driving engagement with said carrier rollers, and a frame structure supporting said rollers and power member, comprising pairs of inner and outer, parallel upright rails on opposite lateral sides of said power member, the inner rail being provided with integral lower and upper flanges elongated in the direction of the length of the rail and extending respectively, laterally inwardly and outwardly thereof, each flange having a longitudinally spaced series of recesses opening upwardly therethrough, said respective series of carrier and pressure rollers having their ends removably received from above in said recesses, the outer rail being disposed in parallel, laterally adjacent relation to the exterior of said inner rail, outwardly of the shaft ends of said pressure rollers, and being provided with adjustable means engaging said inner rail to support the latter.

4. A powered roller conveyor comprising a series of carrier rollers having parallel, longitudinally spaced axes, an endless power member having one surface engaged by said rollers to drive said rollers, a series of presssure rollers engaging the opposite surface of said power member to maintain the latter in driving engagement with said carrier rollers, and a frame structure supporting said rollers and power member, comprising pairs of inner and outer parallel upright rails on opposite lateral sides of said power member, the inner rail being provided with integral lower and upper portions elongated in the direction of the length thereof and flanged in the direction transverse of said length, said portions each having a longitudinally spaced series of recesses opening upwardly therethrough, said respective series of carrier and pressure rollers having their ends removably received from above in the recesses, the outer rail being disposed in parallel, laterally adjacent relation to the exterior of said inner rail, outwardly of the shaft ends of said pressure rollers, and being provided with an upright web portion having upper and lower, laterally outwardly projecting flanges, said last named upper flange carrying adjustable means engaging said inner rail to support the latter.

5. A powered roller conveyor comprising a series of carrier rollers having parallel, longitudinally spaced axes, an endless power member having one surface engaged by said rollers to drive said rollers, a series of pressure rollers engaging the opposite surface of said power member to maintain the latter in driving engagement with said carrier rollers, and a frame structure supporting said rollers and power member, comprising pairs of inner and outer parallel upright rails on opposite lateral sides of said power member, the inner rail being provided with integral lower and upper flanges elongated in the direction of the length of the rail and extending respectively, laterally inwardly and outwardly thereof, each flange having a longitudinally spaced series of recesses opening upwardly therethrough, said respective series of carrier and pressure rollers having their ends removably received from above in said recesses, the outer rail being disposed in parallel, laterally adjacent relation to the exterior of said inner rail, outwardly of the shaft ends of said pressure rollers, and being provided with an upright web portion having upper and lower, laterally outwardly projecting flanges, said last named upper flange carrying vertically upwardly extending, adjustable means engaging the upper flange of said inner rail to support the latter.

6. A powered roller conveyor comprising a series of carrier rollers having parallel, longitudinally spaced axes, an endless power member having one surface engaged by said rollers to drive said rollers, a series of pressure rollers engaging the opposite surface of said power member to maintain the latter in driving engagement with said carrier rollers, and a frame structure supporting said rollers and power member, comprising pairs of inner and outer parallel upright rails on opposite lateral sides of said power member, the inner rail being provided with integral vertically spaced portions each having a longitudinally spaced series of upright recesses, said respective series of carrier and pressure rollers having their ends received in said recesses, the outer rail being disposed in parallel, laterally adjacent relation to the exterior of said inner rail, outwardly of the shaft ends of said pressure rollers, adjustable means engaging said inner rail to support the latter on said outer rail and a unit to brace said respective pairs of rails in laterally spaced relation to one another, comprising a transversely extending sheet metal member having upwardly extending portions in edge engagement at longitudinally spaced points, and along a substantial length of engagement, with interior surfaces of said outer rails beneath the respective inner rails.

7. A powered roller conveyor comprising a series of carrier rollers having parallel, longitudinally spaced axes, an endless power member having one surface engaged by said rollers to drive said rollers, a series of pressure rollers engaging the opposite surface of said power member to maintain the latter in driving engagement with said carrier rollers, and a frame structure supporting said rollers and power member, comprising pairs of inner and outer, parallel upright rails on opposite lateral sides of said power member, the inner rail being provided with integral lower and upper portions each having a longitudinally spaced series of recesses opening upwardly therethrough, said respective series of carrier and pressure rollers having their ends removably received from above in said recesses, the outer rail being disposed in parallel, laterally adjacent relation to the exterior of said inner rail, outwardly of the shaft ends of said pressure rollers, and being provided with adjustable means engaging said inner rail to support the latter, a unit to brace said respective pairs of rails in laterally spaced relation to one another, comprising a transversely extending sheet metal member formed to provide longitudinally spaced, upwardly extending portions having opposed sides in edge engagement at longitudinally spaced points, and along a substantial length of engagement, with interior surfaces of said outer rails beneath the respective inner rails, and transverse tie means carried by said upwardly extending portions of said sheet metal member, said tie means being connected at the ends thereof to said respective outer rails to draw the same against said sheet metal member.

8. A powered roller conveyor comprising a series of carrier rollers having parallel, longitudinally spaced axes, an endless power member having one surface engaged by said rollers to drive said rollers, a series of pressure rollers engaging the opposite surface of said power member to maintain the latter in driving engagement with said carrier rollers, and a frame structure supporting said rollers and power member, comprising pairs of inner and outer parallel upright rails on opposite lateral sides of said power member, the inner rail being provided with integral lower and upper portions elongated in the direction of the length thereof and flanged in the direction transverse of said length, said portions each having a longitudinally spaced series of recesses opening upwardly therethrough, said respective series of carrier and pressure rollers having their ends removably received from above in said recesses, the outer rail being disposed in parallel, laterally adjacent relation to the exterior of said inner rail, outwardly of the shaft ends of said pressure rollers, and being provided with an upright web portion having upper and lower, laterally outwardly projecting flanges, said last named upper flange carrying adjustable means engaging said inner rail to support the latter, a unit to brace said respective pairs of rails in laterally spaced relation to one another, and a support secured to the lower flanges of said outer rails to sustain said support structure.

9. A powered roller conveyor comprising a series of carrier rollers having parallel, longitudinally spaced axes, an endless power member having one surface engaged by said rollers to drive said rollers, a series of pressure rollers engaging the opposite surface of said power member to maintain the latter in driving engagement with said carrier rollers, and a frame structure supporting said rollers and power member, comprising pairs of inner and outer parallel upright rails on opposite lateral sides of said power member, the inner rail being provided with integral lower and upper portions each having a longitudinally spaced series of recesses opening upwardly therethrough, said respective series of carrier and pressure rollers having their ends removably received from above in said recesses, the outer rail being disposed in parallel, laterally adjacent relation to the exterior of said inner rail, outwardly of the shaft ends of said pressure rollers, and being provided with an upright web portion having upper and lower, laterally outwardly projecting flanges, said last named upper flange carrying adjustable means engaging said inner rail to support the latter, a unit to brace said respective pairs of rails in laterally spaced relation to one tanother, comprising a transversely extending sheet metal member in edge engagement at longitudinally spaced points, and along a substantial length of engagement, with interior surfaces of said outer rails beneath the respective inner rails, and transverse tie means carried by said sheet metal member, said tie means being connected at the ends thereof to said respective outer rails to draw the same against said sheet metal member, and a support secured to the lower flanges of said outer rails to sustain said support structure.

10. A powered roller conveyor comprising a series of carrier rollers having parallel, longitudinally spaced axes, an endless power member having one surface engaged by said rollers to drive said rollers, a series of pressure rollers engaging the opposite surface of said power member to maintain the latter in driving engagement with said carrier rollers, and a frame structure supporting said rollers and power member, comprising pairs of inner and outer parallel upright rails on opposite lateral sides of said power member, the inner rail being provided with integral lower and upper portions elongated in the direction of the length thereof and flanged in the direction transverse of said length, said portions each having a longitudinally spaced series of recesses opening upwardly therethrough, said respective series of carrier and pressure rollers having their ends removably received from above in said recesses, the outer rail being disposed in parallel, laterally adjacent relation to the exterior of said inner rail, outwardly of the shaft ends of said pressure rollers, and being provided with an upright web portion having upper and lower, laterally outwardly projecting flanges, said last named upper flange carrying adjustable means engaging said inner rail to support the latter, a unit to brace said respective pairs of rails in laterally spaced relation to one another, comprising a transversely extending sheet metal member formed to provide longitudinally spaced, upwardly extending portions having opposed sides in edge engagement at longitudinally spaced points, and along a substantial length of engagement, with interior surfaces of said outer rails beneath the respective inner rails, and transvesre tie means carried by said upwardly extending portions of said sheet metal member, said tie means being connected at the ends thereof to said respective outer rails to draw the same against said sheet metal member, and a support secured to the lower flanges of said outer rails to sustain said support structure.

11. Frame structure for the support of two vertically spaced longitudinal series of conveyor rollers, comprising pairs of parallel, longitudinally extending and laterally spaced inner and outer upright rails, the respective inner and outer rails being in side-by-side relation and said inner rails having elongated, vertically spaced flanges integral therewith and extending longitudinally thereof, said flanges each having a longitudinal series of recesses opening upwardly therethrough in which opposite ends of the rollers of said respective first named series may be received from above and guided independently of said outer rails, and means carried by said outer rails to vertically adjust and support the respective inner rails.

12. Frame structure in accordance with claim 11, in which said inner rails have an upright web portion at which they are secured to the respective outer rails.

13. Frame structure in accordance with claim 11, in which said inner rails have an upright web portion at which they are adapted to be secured to the respective outer rails, said inner rail being engaged from beneath at the upper flange thereof by said supporting means.

14. Frame structure in accordance with claim 11, in which the upper flange of each of said inner rails is outwardly directed and engaged from beneath by said supporting means.

15. A powered roller conveyor comprising a series of carrier rollers having parallel, longitudinally spaced axes, an endless power member having one surface engaged by said rollers to drive said rollers, a series of pressure rollers engaging the opposite surface of said power member to maintain the latter in driving engagement with said carrier rollers, and a frame structure supporting said rollers and power member, comprising pairs of inner and outer parallel upright rails on opposite lateral sides of said power member, the inner rail being provided with integral lower and upper portions elongated in the direction of the length thereof and flanged in the direction transverse of said length, said portions each having a longitudinally spaced series of recesses opening upwardly therethrough, said respective series of carrier and pressure rollers having their ends removably received from above in said recesses, the outer rail being disposed in parallel, laterally adjacent relation to the exterior of said inner rail, outwardly of the shaft ends of said pressure rollers, and being provided with an upright web portion having upper and lower, laterally outwardly projecting flanges, said last named upper flange carrying adjustable means engaging said inner rail to support the latter, a unit to brace said respective pairs of rails in laterally spaced relation to one another, comprising a transversely extending sheet metal member formed to provide longitudinally spaced, upwardly extending portions having opposed sides in edge engagement at longitudinally spaced points, and along a substantial length of engagement, with interior surfaces of said outer rails beneath the respective inner rails, and transverse tie means carried by said upwardly extending portions of said sheet metal member, said tie means being connected at the ends thereof to said respective outer rails to draw the same against said sheet metal member, and a support secured to the lower flanges of said outer rails to sustain said support structure, said sheet metal member having a horizontal portion connecting said longitudinally spaced, upwardly extending portions thereof, said support having means engaging said horizontal portion from beneath and clamping the same to said lower flange of the outer rail.

16. Frame structure in accordance with claim 15, in which there are pairs of said inner and outer rails arranged end to end and spliced in this arrangement by a bracing unit as described and bridging the joint thereof.

17. Frame structure in accordance with claim 15, in which there are pairs of said inner and outer rails arranged end to end and spliced in this arrangement by a bracing unit as described and bridging the joint thereof, said tie means comprising the rods connected respectively to outer rails on either side of the joint.

References Cited in the file of this patent

UNITED STATES PATENTS

| | | |
|---|---|---|
| 1,276,724 | Cowley | Aug. 27, 1918 |
| 2,022,272 | Bradley | Nov. 26, 1935 |
| 2,827,153 | Olk et al. | Mar. 18, 1958 |